United States Patent [19]

Hwang

[11] Patent Number: 5,084,697
[45] Date of Patent: Jan. 28, 1992

[54] ERROR-FREE CONTROL CIRCUIT FOR ALARM DETECTORS

[76] Inventor: Shih-Ming Hwang, No. 11, Alley 12, Lane 7, Ching Tyan Street, Taipei, Taiwan

[21] Appl. No.: 317,707

[22] Filed: Mar. 1, 1989

[51] Int. Cl.$^5$ ............................................. G08B 13/00
[52] U.S. Cl. ................................... 340/541; 340/529; 340/566
[58] Field of Search ............... 340/541, 566, 552-556, 340/429, 526, 529-530, 309.15; 367/93-94; 439/638

[56] References Cited

U.S. PATENT DOCUMENTS

| | | | |
|---|---|---|---|
| 4,331,952 | 5/1982 | Galvin et al. | 340/522 X |
| 4,365,239 | 12/1982 | Mongeon | 340/566 X |
| 4,521,768 | 6/1985 | Haran et al. | 340/566 |
| 4,568,920 | 2/1986 | Mombelli | 340/566 |
| 4,803,468 | 2/1989 | Seifert | 340/566 |

Primary Examiner—Glen R. Swann, III
Assistant Examiner—Thomas J. Mullen, Jr.
Attorney, Agent, or Firm—Lowe, Price, LeBlanc & Becker

[57] ABSTRACT

An error-free control circuit for burglar alarm detectors which eliminates false alarms and facilitates setting the sensitivity of the detectors by providing an audible pre-warning signal via some alarm warning device to indicate false alarms and impending violation by a burglar an alarm signal from an alarm upon actual violation by a burglar. When the detector detects a false alarm condition, a pre-warning audible signal is sounded by the alarm warning device for easy sensitivity setting during installation. When the detector detects the sounds of tampering to the car, a pre-warning audible signal is sounded by the alarm warning device to warn the would-be burglar that the premises are protected by an armed alarm. Finally, when the detector detects actual violation of the protected premises, the alarm sounds to scare the burglar away. By this means, an alarm detector can be set to give optimum performance under any condition.

21 Claims, 1 Drawing Sheet

ERROR-FREE CONTROL CIRCUIT FOR ALARM DETECTORS

BACKGROUND OF THE INVENTION

Most burglar alarms, whether designed to protect residences, commercial properties, or vehicles, sound a warning device upon intrusion of a burglar or vandal so as to frighten said burglar or vandal away. Such alarms typically include some form of detector to detect any shock, motion, or glass-breakage cause by the burglar's or vandal's entry. However, due to the difficulty of distinguishing break-in and vandal attempts from the sound or shock caused by such environmental factors as passing trucks, thunder, wind, or rain, setting the proper sensitivity of such a detector presents a problem to the installer of the alarm system. If the sensitivity is set too high, environmental factors such as those described above may cause the alarm to trigger falsely (this is called a false alarm). But if the sensitivity is set too low, the detector may not be able to detect the burglar's or vandal's entry (which shall be referred to as a "no-alarm"). The present invention is therefore related to an error-free control circuit to prevent false alarms and no-alarms of an alarm's shock, motion, or glass break detector, and thus ensure the alarm's optimum performance.

For the purpose of clarity, in the rest of this patent application, the words "detector" and "detectors" includes any shock, motion, glass break, microwave, infra-red, or other such detectors. Note that such detectors are available from various sources, and therefore are not parts for which a patent is being sought. The word "violation" shall refer to any break-in or vandalism to some protected premises. The work "burglar" shall refer to any burglar or vandal.

According to the present invention, said error-free control circuit provides the following features:

1. The error-free control circuit causes said alarm to sound a temporary pre-entry warning sound when the detector detects any of the above-described environmental noises which might cause a false alarm. Said environmental noises may be interpreted as entry by a burglar by conventional alarms. Such a pre-warning sound warns the car's owner or the alarm's installer that the detector's sensitivity may be set too high.

2. The error-free control circuit causes said alarm to sound a temporary pre-entry warning sound when the detector detects such sounds as a revving motorcycle engine or accidentally hitting the car when the door of a neighboring car is opened. Such a pre-entry warning sound warns persons that they may cause the alarm to sound if they are not more careful.

3. The error-free control circuit causes said alarm to sound when the detectors detect actual violation by burglars.

4. The error-free control circuit causes said alarm to sound a temporary pre-entry warning sound when the detector detects such sounds as someone tapping on the window glass or moving the car's door latch. Such a pre-entry warning sound warns would-be burglars that the detector is working to detect actual violation attempts 5. The error-free control circuit allows easy installation and setting of the detector's sensitivity by giving the above-mentioned warning signals to indicate sensitivity may be set too high, as well as giving a special short alarm sound to indicate detection of actual violation.

SUMMARY OF THE INVENTION

The present invention is an error-free control circuit for burglar alarm detectors to eliminate false alarms which provides an audible pre-warning signal from the alarm to indicate false alarms and impending violation by a burglar and which provides for an alarm signal from an alarm upon actual violation by a burglar. When said detector detects environmental noises which may cause false alarms in conventional detectors, a pre-warning audible signal is sounded by the alarm for easy sensitivity setting during installation. When said detector detects the sounds of tampering to the car a pre-warning audible signal is sounded by the alarm to warn the would-be burglar that the alarm is working. Finally, when said detector detects actual violation of the protected premises, the alarm sounds to scare the burglar away. By this means, an alarm detector can be set to give optimum performance under any condition.

DETAILED DESCRIPTION OF THE PREFERRED EMBODIMENT

Figure 1:
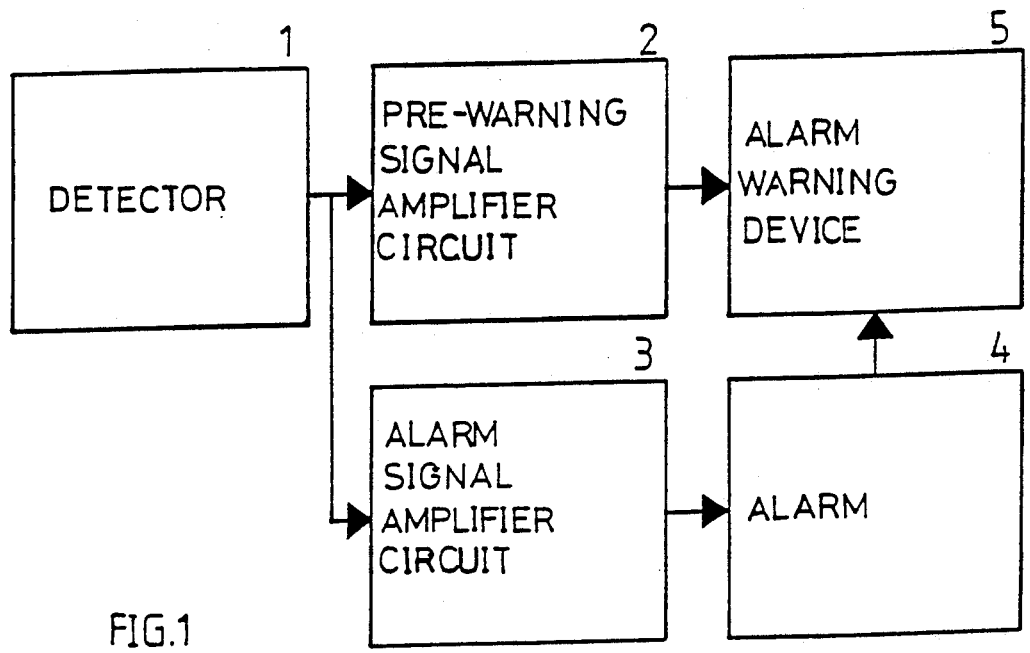
FIG. 1 is a block diagram of the present invention.

Referring to FIG. 1, a detector (1) is connected to a pre-warning signal amplifier circuit (2) and an alarm signal amplifier circuit (3) respectively. When said detector (1) detects tampering sounds or other conditions which may be interpreted as attempts to violate the protected premises, a signal is sent to some alarm warning device (5) such as a siren, buzzer, flashing light, or bell via said pre-warning signal amplifier circuit (2), which causes said alarm warning device (5) to make a short pre-entry warning of said sound or condition. If said tampering sounds continue after said initial pre-entry warning sound, a charging circuit in said alarm signal amplifier circuit (3) charges until it outputs a signal via said alarm (4) to engage said alarm warning device (5) to scare away said burglars. Furthermore, if said detector (1) detects actual entry by a burglar, the alarm signal amplifier circuit (3) immediately triggers said alarm warning device (5) via said alarm (4).

Note that such alarm warning devices and the alarm as described above are available from various sources, and therefore are not parts for which a patent is being sought.

Figure 2:
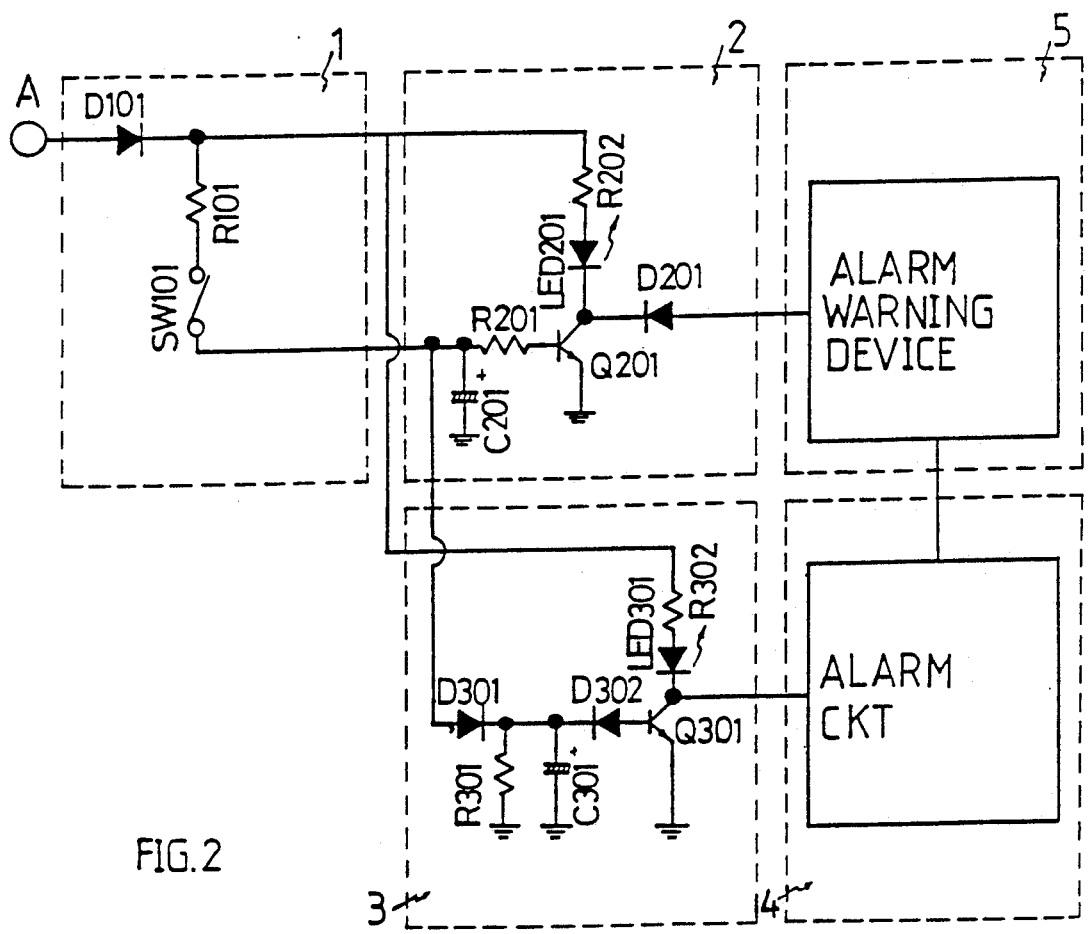
FIG. 2 is a circuit diagram of the present invention.

Referring to FIG. 2, point A is a voltage input to the pre-warning signal amplifier. SW101 a detector which can detect attempted or actual violation of protected premises by a burglar.

Said pre-warning signal amplifier consists of R201, R202, C201, Q201, LED201, and D201. If detector SW101 detects the movement or sound of attempted violation of the protected premises or environmental noises which may cause false alarms, C201 is charged to turn on Q201 to cause the alarm warning device to turn on via D201 for a short time to warn would-be burglars that the premises are protected by armed alarm. At the same time LED201 will light on for the same short time to serve as a quiet signal for use to the alarm installer in setting the sensitivity of the detector. Sensitivity of said pre-warning signal amplifier can be quickly and easily set by an alarm installer watching LED201 and adjusting R202.

Said alarm signal amplifier circuit consists of D301, D302, R301, R302, C301, Q301, and LED301. If detector SW101 detects attempted entry into the protected premises the said pre-warning signal amplifier causes a short warning as shown above. At the same time C301 of said alarm signal amplifier circuit is charged via D301. In the case of either a single prolonged signal or a rapid series of short signals from SW101, both of which indicate actual violation of the protected premises, C301 is charged to the point where a signal can pass via D302 to Q301, which causes LED301 to light on and the alarm to turn on the alarm warning device to warn passers-by of the break-in and to scare the would-be burglars away. However, in the case of a short signal from SW101, such as would be caused by tampering sounds or other conditions which may either be attempts by burglars to determine if the premises are protected by an alarm or may be a false alarm, C301 does not receive enough charge to pass a signal to Q301, which effectively prevents the alarm from triggering the alarm warning device.

Note that circuits of both the said pre-warning signal amplifier circuit and the said alarm signal amplifier circuit contain an LED. Said LEDs are useful for setting the sensitivity of both said circuits, as they allow the alarm installer to adjust both said circuits without the need to trigger said alarm warning device, the sound of which may be bothersome to neighbors. Said LEDs, of course, may be omitted, or may be connected via some external circuit to flash other lights or sound other sounding devices if desired.

Because said pre-warning signal amplifier circuit warns installers and users of possible false-alarm conditions and warns would-be burglars that tampering the protected premises may trigger an alarm, and because said alarm signal amplifier circuit causes the alarm to warn passers-by and neighbors of violations to the protected premises and scare burglars away, and because the sensitivity of both said circuits is easy to set, the present invention is indeed a most useful addition to a security system.

I claim:

1. An error-free control circuit for burglar alarm detectors which includes a shock, motion, glass break, ultrasonic, microwave, or other detector; a pre-warning signal amplifier circuit connected to said detector which can trigger some alarm warning device, and which includes a signal amplifier and a first visual display device; and an alarm signal amplifier circuit connected to said detector which can trigger an alarm to trigger said alarm warning device, and which includes a signal amplifier and a second visual display device; and a circuit to provide a short pre-warning signal to said alarm warning device in response to a short signal from said detector indicating some environmental condition which may cause a false alarm or some action by a burglar or vandal in preparation of breaking into or vandalizing the protected premises, and to provide a signal to said alarm to trigger said alarm warning device in response to a long signal or a rapid series of short signals from said detector indicating an actual break-in or vandalism to the protected premises to alert passer-by and neighbors to the violation of the protected premises and to scare thieves and vandals away.

2. An error-free control circuit for burglar alarm detectors according to claim 1 wherein said pre-warning signal amplifier circuit drives said alarm warning device for a short period of time upon receipt of a short signal from said detector, with said pre-warning signal amplifier circuit including an LED or other display to indicate transmission of said signal to said alarm warning device.

3. An error-free control circuit for burglar alarm detectors according to claim 1 wherein said alarm signal amplifier circuit triggers said alarm in response to a long signal or a rapid series of short signals from said detector, with said alarm signal amplifier circuit including a visual display device to indicate triggering of said alarm.

4. A security alarm circuit comprising:
   detector means for detecting an intrusion attempt and, in response to detecting an intrusion attempt, generating an intrusion signal;
   pre-warning means for generating an initial warning signal in response to said intrusion signal, said pre-warning means responsive to said intrusion signal for detecting a first duration of said intrusion signal and displaying an indication of said initial warning signal; and
   alarm means responsive to said intrusion signal and, in response to detecting a second duration of said intrusion signal, providing (i) an alarm signal for activating an alarm warning device and (ii) a visual indication thereof, said second duration being greater than said first duration.

5. A security alarm circuit comprising:
   detector means for detecting an intrusion attempt and, in response, generating an intrusion signal;
   pre-warning alarm means including an integrating circuit having a first time constant for receiving and integrating said intrusion signal over time to form a first alarm control signal and in response to said first alarm control signal generating an initial warning alarm signal;
   pre-warning indicator means for providing a visually perceptible display indication in response to said initial warning alarm signal; and
   alarm means including an integrating circuit having a second time constant which is longer than said first time constant, said alarm means for receiving and integrating said intrusion signal over time to form a second alarm control signal and in response to said second alarm control signal supplying an alarm activation signal and displaying a visual indication, whereby an intrusion signal duration of at least a first duration indicates an imminent activation of an alarm warning device and an intrusion signal duration of greater than a second duration activates said alarm warning device.

6. The security alarm circuit according to claim 5 further comprising light emitting diode means for providing said visual indication of said second alarm control signal.

7. The security alarm circuit according to claim 5 further comprising light emitting diode means for providing said visual indication of said initial warning alarm signal.

8. The security alarm circuit according to claim 5 further comprising means for providing an audible indication of said initial warning alarm signal.

9. A security alarm circuit comprising:
   intrusion detection means for detecting a physical disturbance and, in response, providing an intrusion signal;
   pre-warning detector means for supplying an initial warning signal in response to a first duration of said intrusion signal, said initial warning signal supplied for a period responsive to a duration of said intrusion signal;

pre-warning indicator means for supplying a visual indication in response to said initial warning signal;

alarm activation means for supplying an alarm activation signal in response to a second duration of said intrusion signal, said second duration being longer than said first duration;

intrusion alarm means responsive to said alarm activation signal for supplying an alarm transducer signal of a first predetermined duration; and alarm transducer means responsive to said initial warning signal and to said alarm transducer signal for supplying a human perceptible alerting signal to provide an alert of an attempted break-in.

10. The security alarm system according to claim 9, further comprising alarm activation indicator means for supplying a visual indication in response to said alarm activation signal.

11. The security alarm system according to claim 9, wherein
said pre-warning detector means includes
(i) a first input node receiving said intrusion signal,
(ii) a first capacitor connected between said first input node and a source of ground potential,
(iii) a first resistor having a first terminal connected to common to said first input node and said first capacitor,
(iv) a first transistor having a control electrode connected to a second terminal of said first resistor for receiving said intrusion signal, a first switched electrode connected to a source of power through said pre-warning indicator means, and a second switched electrode connected to said source of ground potential, and
(v) a first output node connected to said first transistor first switched electrode for supplying said initial warning signal; and
wherein said alarm activation means includes
(i) a second input node receiving said intrusion signal,
(ii) a second capacitor and a second resistor parallel connected between said second input node and said source of ground potential,
(iii) a first diode having a first terminal connected in common to said second input node and said parallel connected second capacitor and second resistor,
(iv) a second transistor having a control electrode connected to a second terminal of said first diode for receiving said intrusion signal, a first switched electrode connected to said source of power, and a second switched electrode connected to said source of ground potential, and
(v) a second output node connected to said second transistor first switched electrode for supplying said alarm transducer signal.

12. The security alarm system according to claim 11, wherein said first switched electrode of said first transistor is connected to said first output node through a second diode and said second input node receives said intrusion signal through a third diode.

13. The security alarm system according to claim 11, further comprising alarm activation indicator means for supplying a visual indication in response to said alarm activation signal.

14. The security alarm system according to claim 11, wherein
said first and second transistors each comprises a bipolar transistor, said control electrodes each comprises a base electrode of a respective transistor and said first and second switched electrodes respectively comprise collector and emitter electrodes of said respective transistors; and
said pre-warning indicator comprises a first light emitting diode connected in series with a collector to emitter path of said first transistor.

15. The security alarm system according to claim 14, further comprising a second light emitting diode for supplying a visual indication in response to said alarm activation signal, said first switched electrode of said second transistor connected to said source of power through second light emitting diode.

16. A universal adapter for insertion between an intrusion detector of a security alarm system and an alarm apparatus, the intrusion detector detecting a physical disturbance and, in response, providing an intrusion signal, the alarm apparatus including (i) an alarm transducer supplying an alerting signal in response to first and second alarm transducer signals, and (ii) an intrusion alarm control circuit supplying said first alarm transducer signal of a first predetermined duration to said alarm transducer in response to the intrusion signal, the universal adapter comprising:

pre-warning detector means for supplying said second alarm transducer signal to said alarm transducer in response to a first duration of said intrusion signal, said initial warning signal supplied for a period responsive to a duration of said intrusion signal;

pre-warning indicator means for supplying a visual indication in response to said second alarm transducer signal; and alarm activation means for inhibiting application of said intrusion signal to said intrusion alarm control circuit in response to an intrusion signal duration less than a second predetermined period and for supplying said intrusion alarm signal to said alarm control circuit in response to an intrusion signal duration greater than said second predetermined period, said second predetermined period being greater than said first predetermined period.

17. The universal adapter according to claim 16, wherein said alarm activation means further comprises a visual indicator responsive to said intrusion alarm signal.

18. The universal adapter according to claim 17, wherein
said pre-warning detector means includes
(i) a first input node receiving said intrusion signal,
(ii) a first capacitor connected between said first input node and a source of ground potential,
(iii) a first resistor having a first terminal connected in common to said first input node and said first capacitor,
(iv) a first transistor having a control electrode connected to a second terminal of said first resistor for receiving said intrusion signal, a first switched electrode connected to a source of power through said pre-warning indicator means, and a second switched terminal connected to said source of ground potential, and
(v) a first output node connected to said first transistor first switched electrode for supplying said second alarm transducer signal to said alarm transducer; and wherein said alarm activation means includes
  (i) a second input node receiving said intrusion signal,
  (ii) a second capacitor and a second resistor parallel connected between said second input node and said source of ground potential,
  (iii) a first diode having a first terminal connected in common to said second input node and said parallel connected second capacitor and second resistor,
  (iv) a second transistor having a control electrode connected to a second terminal of said first diode for receiving said intrusion signal, a first switched electrode connected to said source of power, and a second switched electrode connected to said source of ground potential, and
  (v) a second output node connected to said second transistor first switched electrode for supplying said intrusion alarm signal to said alarm control circuit.

19. The security alarm system according to claim 18, wherein said first switched electrode of said first transistor is connected to said first output node through a second diode and said second input node receives said intrusion signal through a third diode.

20. The universal adapter according to claim 18, wherein
said first and second transistors each comprises a bipolar transistor, said control electrodes each comprises a base electrode of a respective transistor and said first and second switched electrodes respectively comprise collector and emitter electrodes of said respective transistors; and
said pre-warning indicator comprises a first light emitting diode.

21. The universal adapter according to claim 20, further comprising a second light emitting diode for supplying a visual indication in response to said intrusion alarm signal, said first switched electrode of said second transistor connected to said source of power through said second light emitting diode.

* * * * *